(12) United States Patent
Kestler

(10) Patent No.: US 10,569,894 B2
(45) Date of Patent: Feb. 25, 2020

(54) LOCATING AN APERTURE BASED ON A SIGNATURE OF AN EMBEDDED CONDUCTIVE ELEMENT

(71) Applicant: Rohr, Inc., Chula Vista, CA (US)

(72) Inventor: Steven M. Kestler, Winchester, CA (US)

(73) Assignee: Rohr, Inc., Chula Vista, CA (US)

( * ) Notice: Subject to any disclaimer, the term of this patent is extended or adjusted under 35 U.S.C. 154(b) by 309 days.

(21) Appl. No.: 15/784,798

(22) Filed: Oct. 16, 2017

(65) Prior Publication Data

US 2019/0112064 A1  Apr. 18, 2019

(51) Int. Cl.

| | |
|---|---|
| *H01R 43/00* | (2006.01) |
| *B64D 33/02* | (2006.01) |
| *B23B 35/00* | (2006.01) |
| *G01K 3/14* | (2006.01) |
| *G01J 5/00* | (2006.01) |
| *B64D 29/00* | (2006.01) |

(52) U.S. Cl.
CPC .............. *B64D 33/02* (2013.01); *B23B 35/00* (2013.01); *G01J 5/0003* (2013.01); *G01K 3/14* (2013.01); *B23B 2215/04* (2013.01); *B23B 2270/48* (2013.01); *B64D 29/00* (2013.01); *B64D 2033/0206* (2013.01); *G01J 2005/0077* (2013.01)

(58) Field of Classification Search
CPC ............ B64D 33/02; B64D 2033/0206; B64D 29/00; G01J 5/0003; G01J 2005/0077; G01K 3/14; B23B 35/00; B23B 2215/04; B23B 2270/48; H01L 51/441; Y10T 29/49117; Y10T 29/49155
USPC ..................................... 29/825, 846
See application file for complete search history.

(56) References Cited

U.S. PATENT DOCUMENTS

| 5,582,485 A * | 12/1996 | Lesniak | G01N 25/72 |
| | | | 250/330 |
| 8,220,991 B2 | 7/2012 | Safai et al. | |
| 8,742,347 B2 | 6/2014 | Altmann et al. | |
| 9,592,918 B2 * | 3/2017 | Yu | B64D 33/06 |
| 9,645,012 B2 | 5/2017 | Marsh et al. | |
| 2004/0120383 A1 | 6/2004 | Kennedy et al. | |
| 2010/0062550 A1 * | 3/2010 | Buchel | H01L 51/441 |
| | | | 438/17 |

\* cited by examiner

*Primary Examiner* — Donghai D Nguyen
(74) *Attorney, Agent, or Firm* — Getz Balich LLC

(57) ABSTRACT

A manufacturing method is provided. During this method, a panel is provided that includes non-conductive material and a plurality of conductive elements at least partially embedded within the non-conductive material. The conductive elements include a first conductive element. An electric current is applied to the first conductive element such that the first conductive element produces a signature. A location of the first conductive element in the panel is determined based on the signature. An aperture is formed in the panel based on the determined location of the first conductive element.

20 Claims, 5 Drawing Sheets

LOCATING AN APERTURE BASED ON A SIGNATURE OF AN EMBEDDED CONDUCTIVE ELEMENT

BACKGROUND

1. Technical Field

This disclosure relates generally to a manufacturing method and, more particularly, to a method of manufacturing a component such as, but not limited to, an acoustic panel for an aircraft propulsion system nacelle.

2. Background Information

A nose lip for an airplane propulsion system nacelle may include an electric heater for reducing or preventing ice accumulation thereon. Heater elements of the electric heater may be positioned inside of the nose lip and adjacent an outer skin of the nose lip. Alternatively, the heater elements may be embedded within the outer skin. Typically, when the heater elements are embedded within the outer skin, the heater elements are not visible. As a result, apertures formed in the outer skin may inadvertently pierce, sever or otherwise damage one or more of the heater elements. Such damage can result in an entire grid of the heater elements being rendered non-operational; e.g., short circuiting the heater elements when an electrical current is applied thereto. Such damage may then necessitate replacement of the entire nose lip.

There is a need in the art for an improved method for forming apertures in a skin/panel with at least partially embedded heater elements.

SUMMARY OF THE DISCLOSURE

According to an aspect of the present disclosure, a manufacturing method is provided. During this method, a panel is provided that includes non-conductive material and a plurality of conductive elements at least partially embedded within the non-conductive material. The conductive elements include a first conductive element. An electric current is applied to the first conductive element such that the first conductive element produces a signature. A location of the first conductive element in the panel is determined based on the signature. An aperture in the panel is formed based on the determined location of the first conductive element.

According to another aspect of the present disclosure, another manufacturing method is provided. During this method, a panel is provided that includes non-conductive material and a plurality of conductive elements at least partially embedded within the non-conductive material. The conductive elements are heated. Element locations of at least some of the heated conductive elements are determined in the panel using a thermal sensor system. Aperture locations for a plurality of apertures to be formed in the panel are determined based on locations of the at least some of the heated conductive elements.

During the method, the apertures may be formed in the panel respectively at the aperture locations.

The aperture locations may be determined so as to not coincide with the conductive elements.

The signature may be a heat signature.

The location of the first conductive element may be determined using a thermal sensor system.

The location of the first conductive element may be determined using an infrared camera.

During the method, the electric current may be applied to a second conductive element such that the second conductive element produces a second signature. The conductive elements may include the second conductive element. The second conductive element may be laterally adjacent the first conductive element. A location of the second conductive element in the panel may be determined based on the second signature. The aperture may be formed in the panel further based on the determined second location of the second conductive element such that the aperture is laterally between the first conductive element and the second conductive element.

During the method, a second aperture may be formed in the panel based on the determined location of the first conductive element and the determined second location of the second conductive element.

The aperture may be formed in the panel based on the determined location of the first conductive element such that the aperture does not interfere with the first conductive element.

The forming of the aperture may include drilling the aperture vertically through the panel.

The method may be performed to manufacture a component for an aircraft propulsion system nacelle.

The conductive elements may be configured as heater elements.

The panel may include a heater layer and an outer layer. The heater layer may include the non-conductive material and the conductive elements. The outer layer may cover the heater layer.

The outer layer may be configured from or otherwise include conductive material.

The panel may also include a third layer that covers the heater layer. The heater layer may be sandwiched between the outer layer and the third layer.

The third layer may be configured from or otherwise include conductive material.

During the method, a cellular core may be disposed between the panel and a second panel. The cellular core may be attached to the panel and the second panel.

The foregoing features and the operation of the invention will become more apparent in light of the following description and the accompanying drawings.

DETAILED DESCRIPTION

The present disclosure includes methods for manufacturing a component such as, but not limited to, a structural acoustic panel. An exemplary embodiment of a portion of such an acoustic panel 20 is illustrated in FIG. 1.

Figure 1:
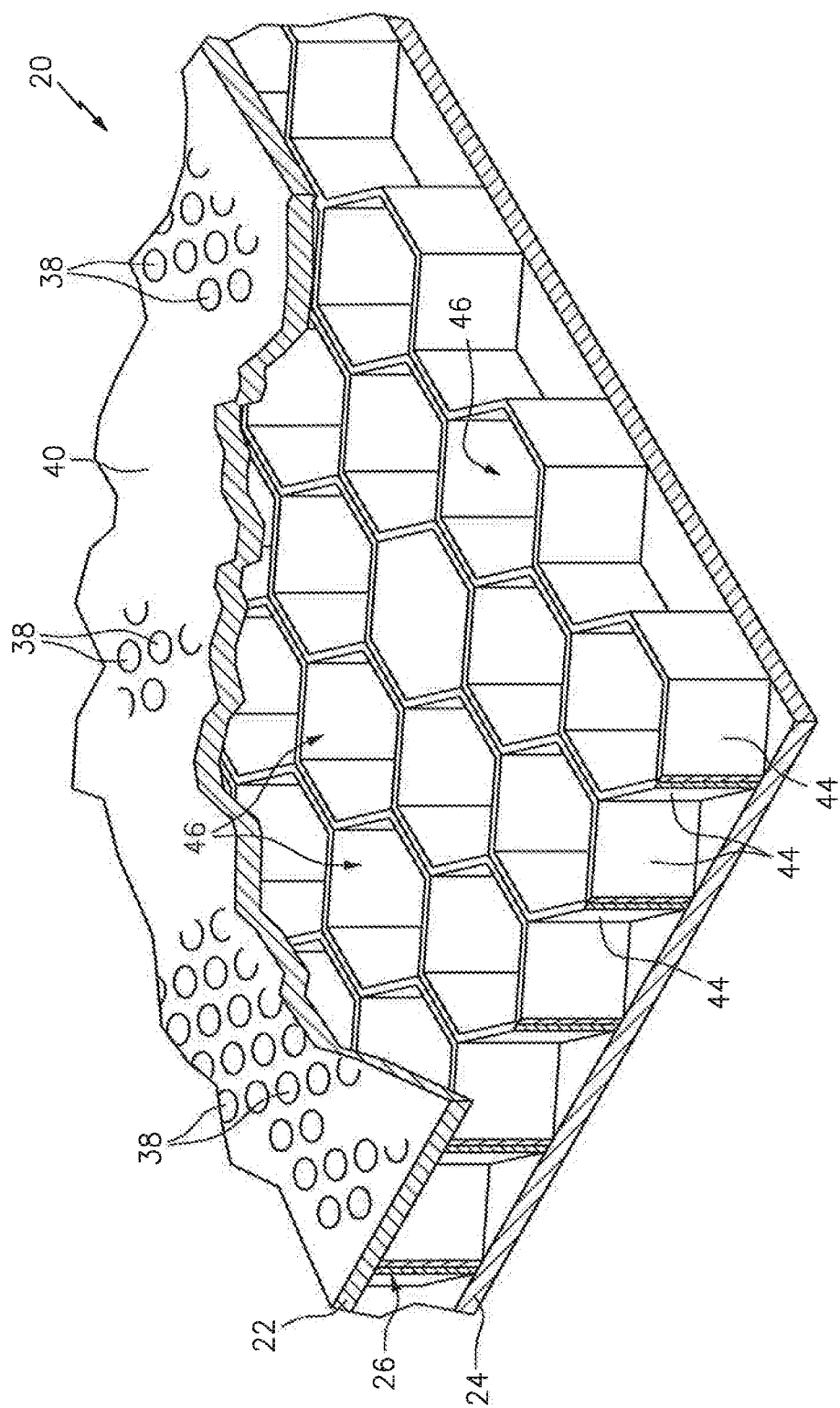
FIG. 1 is a perspective cutaway illustration of a portion of a structural acoustic panel.
Figure 2:
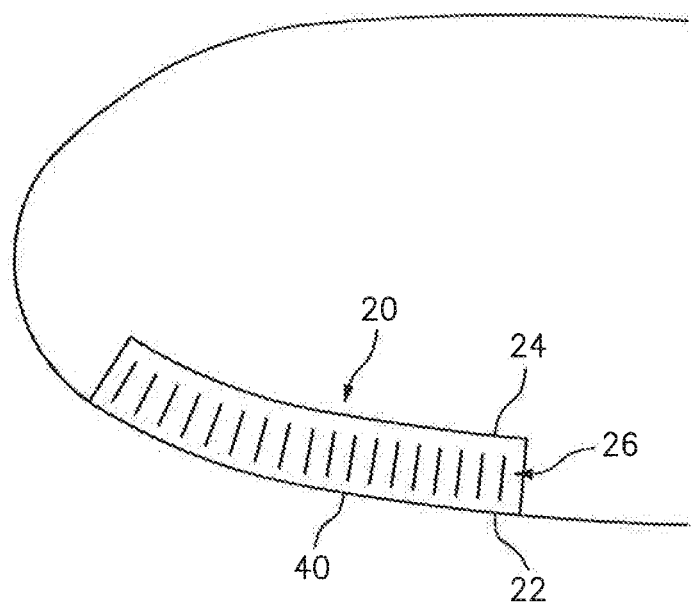
FIG. 2 is a side sectional schematic illustration of an inlet assembly of an aircraft propulsion system nacelle.

The acoustic panel 20 of FIG. 1 may be configured to attenuate noise generated by an aircraft propulsion system such as, for example, a turbofan propulsion system or a turbojet propulsion system. With such a configuration, the acoustic panel 20 may be configured to form part of a nacelle of the propulsion system. The acoustic panel 20, for example, may be configured in a nose lip (e.g., see FIG. 2) or, more generally, a nacelle inlet assembly. The acoustic panel 20 of the present disclosure, however, may alternatively be configured in another component of the nacelle or the propulsion system, or still alternatively for non-aircraft applications and/or non-sound suppression applications.

The acoustic panel 20 of FIG. 1 includes a porous first panel 22 (e.g., a perforated skin), a solid non-porous second panel 24 (e.g., non-perforated second skin) and a cellular core 26. The term "porous" is used herein to describe a body with perforations and/or open cell pores that enable flow of fluid through the body. The term "non-porous" is used herein to describe a body with a configuration that prevents flow of fluid through the body; e.g., a body without perforations or open cell pores.

Figure 3:
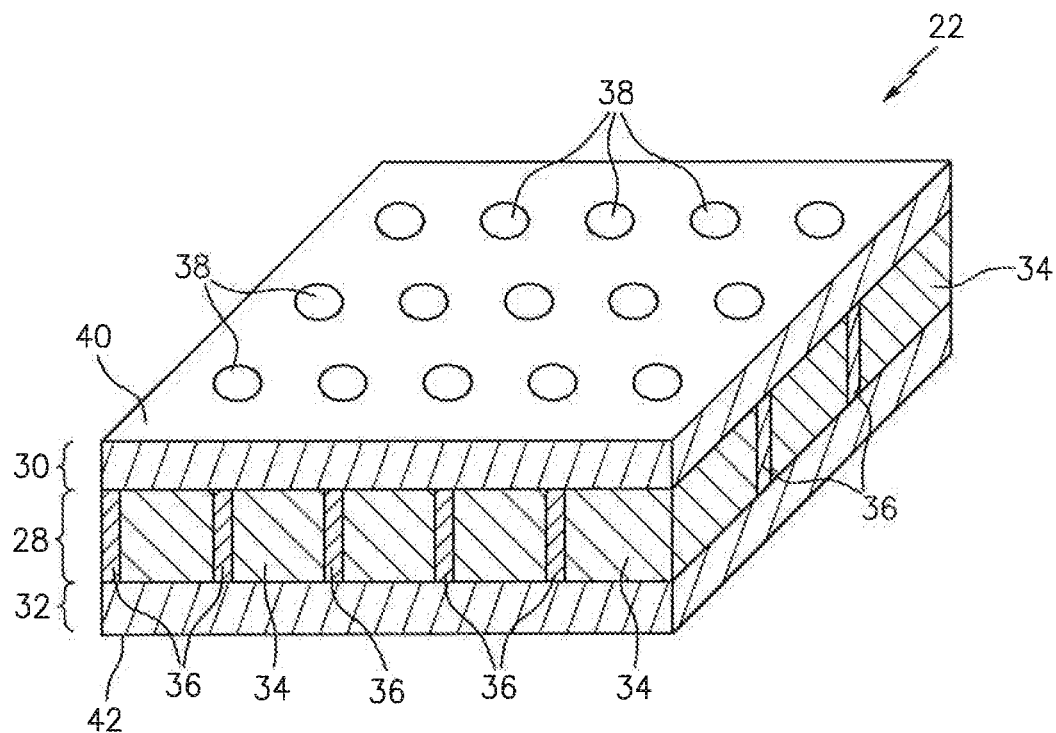
FIG. 3 is a perspective illustration of a portion of a panel/skin of the acoustic panel.

Referring to FIG. 3, the first panel 22 is configured as composite structure. The first panel 22 of FIG. 3, for example, is configured as a multi-layered composite structure. This first panel 22 includes a heater layer 28, an outer layer 30 and another outer layer 32. The heater layer 28 is disposed vertically between and attached (e.g., bonded) to the outer layers 30 and 32.

Figure 4:
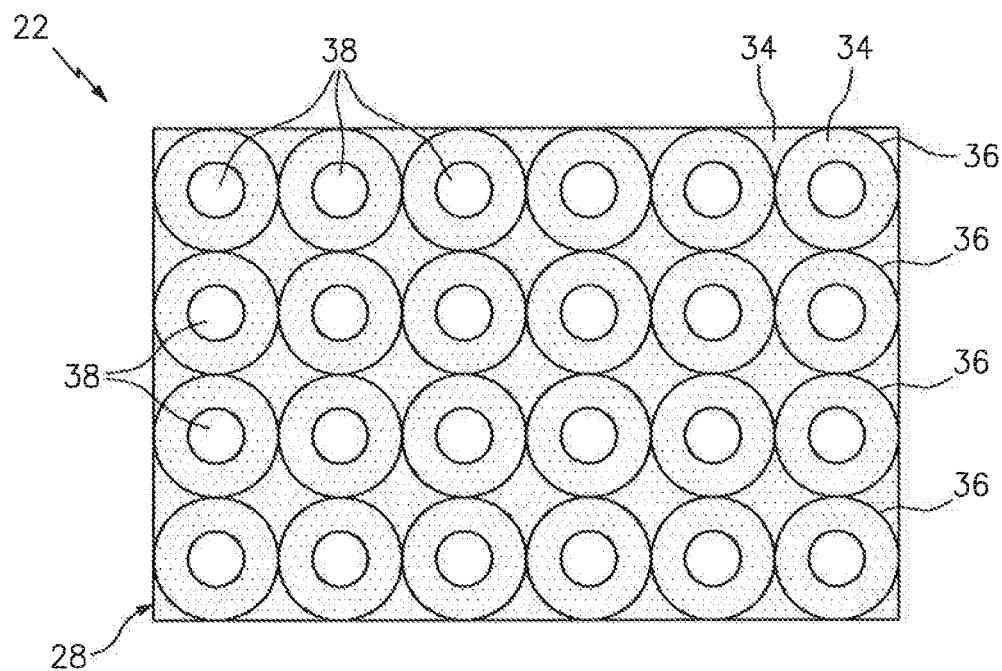
FIG. 4 is a sectional illustration of a portion of the panel/skin of the acoustic panel.

Referring to FIG. 4, the heater layer 28 includes non-conductive material 34 and a plurality of conductive elements 36 at least partially embedded in the non-conductive material 34. The conductive elements 36 may be configured as metal (e.g., copper) heating elements. The conductive elements 36 of FIG. 4 are arranged into an array to provide a mesh/grid structure. The non-conductive material 34 may be polymer-based material (e.g., epoxy-based material), which may or may not include fiber reinforcement material such as, but not limited to, fiber glass, carbon fiber, aramid fiber and/or a mixture thereof.

Referring again to FIG. 3, each outer layer 30, 32 may be configured as a relatively thin sheet of conductive material. This outer layer material may be metal such as, but not limited to, aluminum or aluminum alloy.

The first panel 22 includes a plurality of perforations; e.g., apertures 38 such as through-holes. Each of the apertures 38 extends vertically through the first panel 22 and, thus, through the layers 28, 30 and 32 between opposing sides 40 and 42 of the first panel 22. The first side 40 of FIG. 3 is carried by the outer layer 30 and the second side 42 is carried by the outer layer 32.

Referring to FIG. 4, each of the apertures 38 is located so as substantially not to interfere with (e.g., break, sever, damage, pierce, etc.) one or more or any of the conductive elements 36. For example, each of the apertures 38 may be positioned to be laterally aligned with a gap between laterally adjacent conductive elements 36. In this manner, none of the apertures 38 may be laterally coincident (e.g., aligned and/or overlap) with any of the conductive elements 36.

Referring to FIG. 1, the second panel 24 may be configured as a relatively thin sheet or layer of (e.g., continuous and uninterrupted) material. This second panel 24 material may be, but is not limited to, metal.

The core 26 is arranged radially between and is connected to the first panel 22 and the second panel 24. The core 26, for example, may be welded, brazed, diffusion bonded, fused, adhered and/or otherwise bonded to the first panel 22 and the second panel 24.

The core 26 is configured as an open cell porous structure. The core 26 of FIG. 1, for example, has a honeycomb configuration formed by a plurality of side-by-side corrugated walls 44. With such a configuration, the core 26 includes a plurality of cavities 46. Each of these cavities 46 extends through the core 26 between the first panel 22 and the second panel 24. Each of the cavities 46 is fluidly coupled with one or more of the apertures 38 in the first panel 22. The present disclosure, however, is not limited to such an exemplary core configuration. The core 26, for example, may be configured with a so-called N-core configuration, an example of which is described in U.S. Pat. No. 9,592,918 to Yu et al., or any other structural panel core configuration.

The core material may be, but is not limited to, metal or composite.

Figure 6:
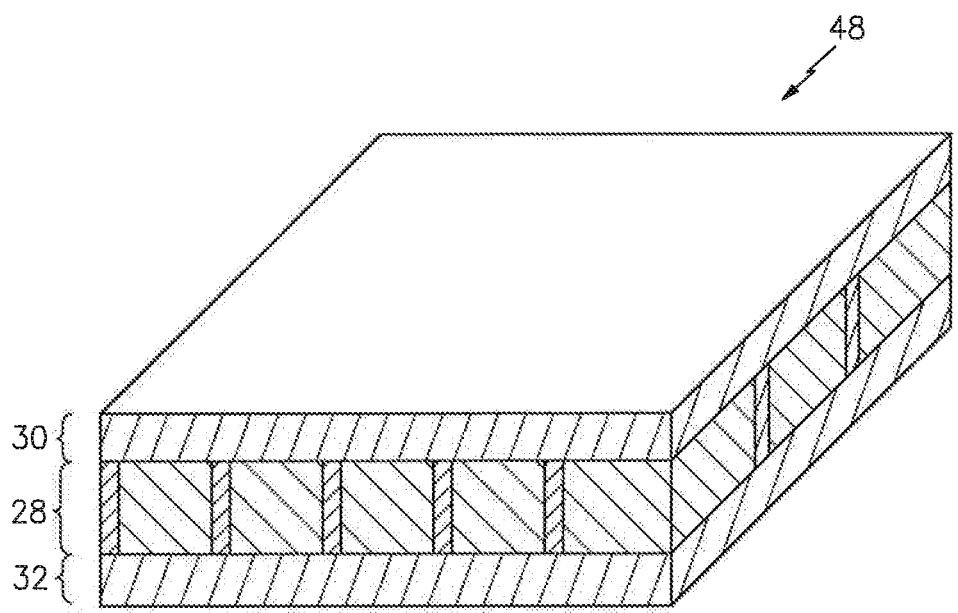
FIG. 6 is a perspective illustration of a portion of a preform panel/skin.
Figure 5:
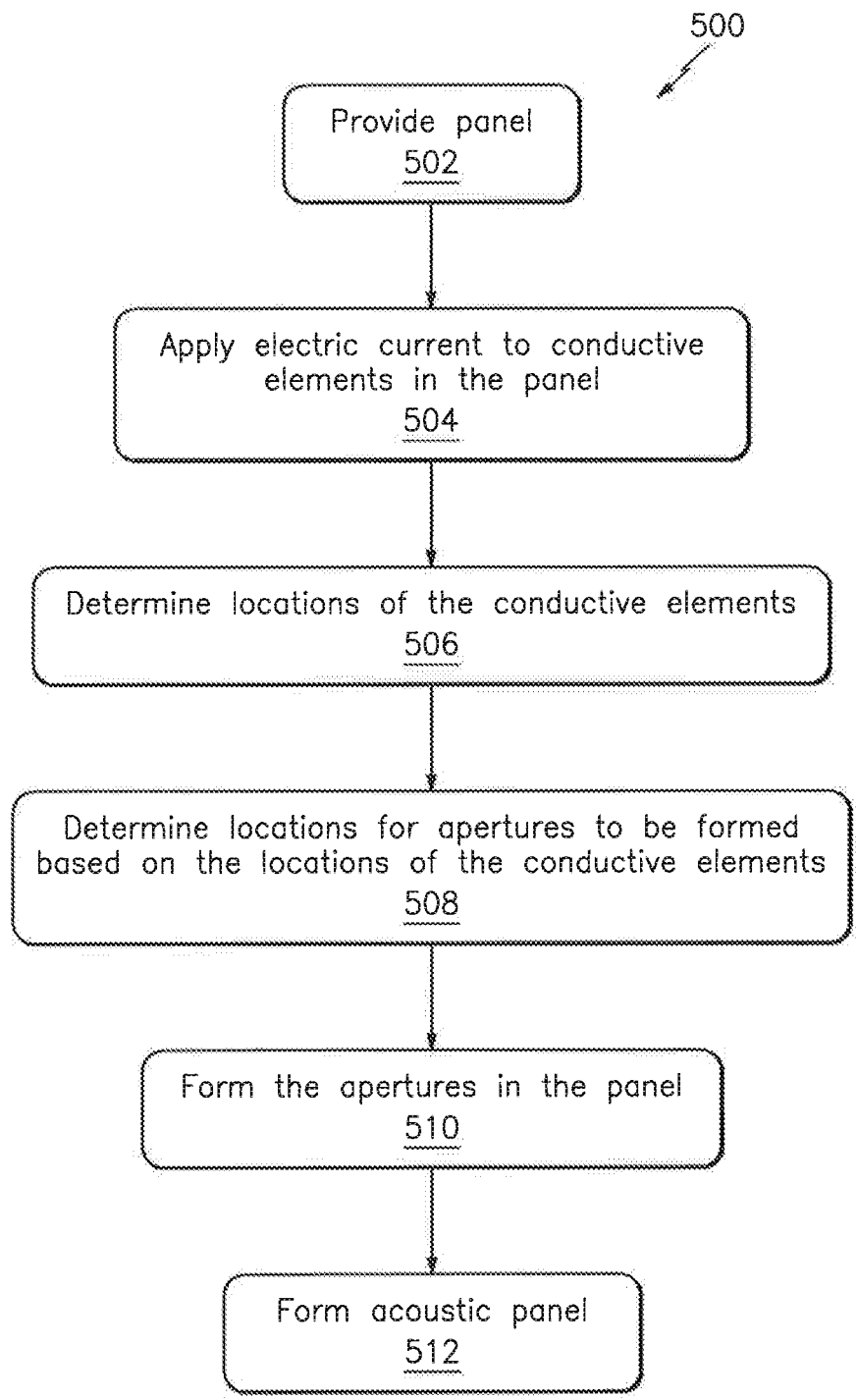
FIG. 5 is a flow diagram of a method for manufacturing a component such as the acoustic panel.

FIG. 5 is a flow diagram of a method 500 for manufacturing a component such as, but not limited to, the acoustic panel 20 of FIG. 1. In step 502, a panel 48 is provided. This panel 48, an exemplary embodiment of which is shown in FIG. 6, may have substantially the same construction as the first panel 22 described above. However, the panel 48 during this step 502 is non-perforated. For example, the panel 48 may include each of the layers 28, 30 and 32 shown in FIG. 3, but is configured without any of the apertures 38.

In step 504, an electric current is applied to at least some of the conductive elements 36 in the panel 48. The application of this electric current may cause the conductive elements 36 to heat up and, thereby, provide each of those heated conductive elements 36 with a respective heat signature.

Figure 7:
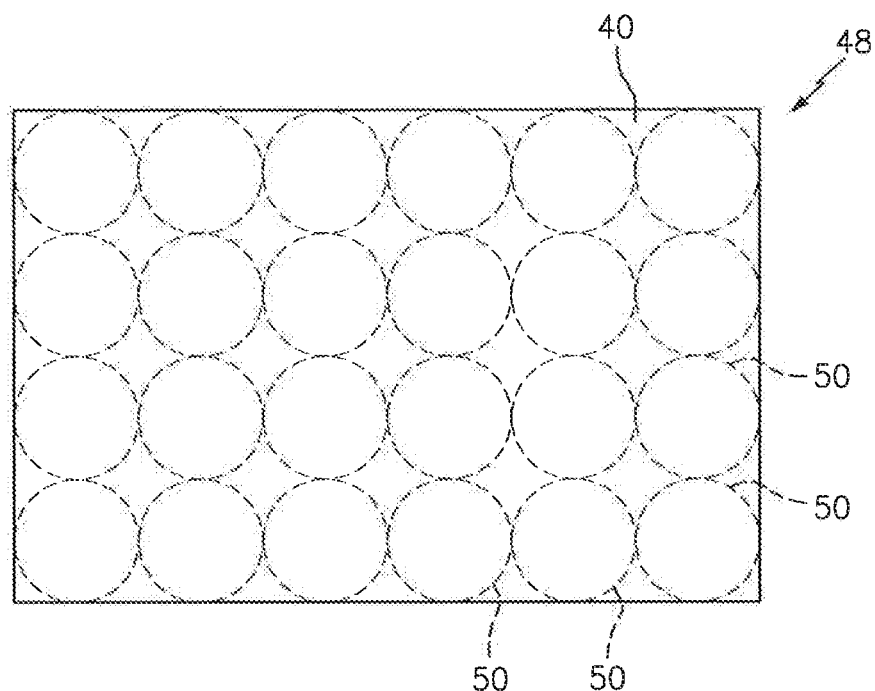
FIG. 7 is a top view illustration of the portion of the preform panel/skin with dashed lines identifying locations of embedded conductive elements.

In step 506 and referring to FIG. 7, element locations 50 of some or all of the heated conductive elements 36 are determined. A thermal sensor system that includes, for example, an infrared (IR) camera may be used to sense (e.g., observe) the heat signatures of some or all of the heated conductive elements 36. In this manner, the thermal sensor system may be used to map out the locations 50 of the conductive elements 36 in the panel 48, even though the elements 36 are not visible to the human eye.

Figure 8:
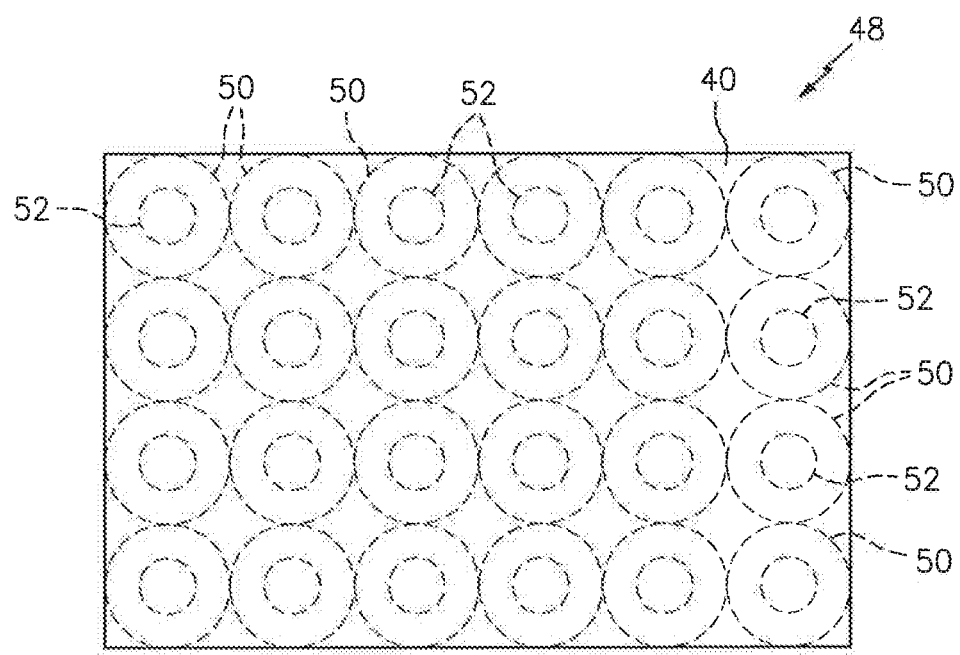
FIG. 8 is a top view illustration of the portion of the preform panel/skin with dashed lines identifying the locations of the embedded conductive elements and additional dashed lines identifying locations of where apertures are to be formed.

In step 508 and referring to FIG. 8, aperture locations 52 are determined for some or all of the apertures 38 to be formed in the panel 48. By knowing the element locations 50 determined during the step 506, the aperture locations 52 are selected such that none of the apertures 38 will interfere with the conductive elements 36. For example, one of the aperture locations 52 of FIG. 8 are each assigned to a gap formed between adjacent conductive elements 36 in the grid.

In step 510, one or more apertures 38 are formed in the panel 48 to provide the first panel 22. For example, one or more of the apertures 38 may be drilled or otherwise machined into the panel 48 at the respective aperture locations 52 determined during the step 508. In this manner, the apertures 38 may be formed in the panel 48 without interfering with the conductive elements 36. As described above, interference of an aperture with a conductive element may result in an entire gird of the conductive elements being rendered non-operational.

In step 512, the acoustic panel 20 is formed. For example, the cellular core 26 may be disposed vertically between the first panel 22 formed in the steps above and the second panel 24. The cellular core 26 may then by attached (e.g., bonded) to the first panel 22 and the second panel 24. Of course, in other embodiments, the acoustic panel elements 22, 24 and 26 may be arranged and bonded together before performance of the steps 502, 504, 506, 508 and 510.

In some embodiments, the method 500 of FIG. 5 may be performed autonomously. For example, the thermal sensor system may be in communication with a machining/drilling system. However, in other embodiments, one or more of the method 500 steps may be performed with aid of a human operator.

In some embodiments, the first panel 22 may include one or more additional layers other than those described above. In other embodiments, at least one of the layers 30 and 32 (e.g., the outer layer 32) may be omitted from the first panel 22.

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined with any one of the aspects and remain within the scope of the invention. Accordingly, the present invention is not to be restricted except in light of the attached claims and their equivalents.

I claim:

1. A manufacturing method, comprising:
providing a panel that includes non-conductive material and a plurality of conductive elements at least partially embedded within the non-conductive material, wherein the conductive elements include a first conductive element;
applying an electric current to the first conductive element such that the first conductive element produces a signature;
determining a location of the first conductive element in the panel based on the signature; and
forming an aperture in the panel based on the determined location of the first conductive element.

2. The method of claim 1, wherein the signature comprises a heat signature.

3. The method of claim 1, wherein the location of the first conductive element is determined using a thermal sensor system.

4. The method of claim 1, wherein the location of the first conductive element is determined using an infrared camera.

5. The method of claim 1, further comprising:
applying the electric current to a second conductive element such that the second conductive element produces a second signature, wherein the conductive elements include the second conductive element, and the second conductive element is laterally adjacent the first conductive element; and
determining a location of the second conductive element in the panel based on the second signature;
wherein the aperture is formed in the panel further based on the determined second location of the second conductive element such that the aperture is laterally between the first conductive element and the second conductive element.

6. The method of claim 5, further comprising forming a second aperture in the panel based on the determined location of the first conductive element and the determined second location of the second conductive element.

7. The method of claim 1, wherein the aperture is formed in the panel based on the determined location of the first conductive element such that the aperture does not interfere with the first conductive element.

8. The method of claim 1, wherein the forming of the aperture comprises drilling the aperture vertically through the panel.

9. The method of claim 1, wherein the method is performed to manufacture a component for an aircraft propulsion system nacelle.

10. The method of claim 1, wherein the conductive elements are configured as heater elements.

11. The method of claim 1, wherein the panel includes a heater layer and an outer layer, the heater layer comprises the non-conductive material and the conductive elements, and the outer layer covers the heater layer.

12. The method of claim 11, wherein the outer layer comprises conductive material.

13. The method of claim 1, wherein the panel further includes a third layer that covers the heater layer, and the heater layer is sandwiched between the outer layer and the third layer.

14. The method of claim 13, wherein the third layer comprises conductive material.

15. The method of claim 1, further comprising:
disposing a cellular core between the panel and a second panel; and
attaching the cellular core to the panel and the second panel.

16. A manufacturing method, comprising:
providing a panel that includes non-conductive material and a plurality of conductive elements at least partially embedded within the non-conductive material;
heating the conductive elements;
determining element locations of at least some of the heated conductive elements in the panel using a thermal sensor system; and
determining aperture locations for a plurality of apertures to be formed in the panel based on locations of the at least some of the heated conductive elements.

17. The method of claim 16, further comprising forming the apertures in the panel respectively at the aperture locations.

18. The method of claim 16, wherein the aperture locations are determined so as to not coincide with the conductive elements.

19. The method of claim 16, wherein the method is performed to manufacture a component for an aircraft propulsion system nacelle.

20. The method of claim 16, wherein the panel includes a heater layer and an outer layer, the heater layer comprises the non-conductive material and the conductive elements, and the outer layer covers the heater layer.

* * * * *